United States Patent [19]
Kaneko et al.

[11] Patent Number: 5,737,068
[45] Date of Patent: Apr. 7, 1998

[54] ELECTRONIC DISTANCE MEASURING DEVICE USING A PHASE DIFFERENCE DETECTION METHOD

[75] Inventors: Atsumi Kaneko; Kiyoshi Yamamoto, both of Tokyo, Japan

[73] Assignee: Asahi Kogaku Kogyo Kabushiki Kaisha, Tokyo, Japan

[21] Appl. No.: 597,899

[22] Filed: Feb. 6, 1996

[30] Foreign Application Priority Data

Feb. 8, 1995 [JP] Japan .................. 7-043404

[51] Int. Cl.⁶ ........................................ G01C 3/08
[52] U.S. Cl. ........................................ 356/5.13
[58] Field of Search ..................... 356/5.09, 5.13; 367/101, 125; 342/127

[56] References Cited

U.S. PATENT DOCUMENTS

| | | | |
|---|---|---|---|
| 3,779,645 | 12/1973 | Nakazawa et al. | 356/5 |
| 4,403,857 | 9/1983 | Hölscher | 356/5 |
| 4,620,788 | 11/1986 | Giger | 356/5 |
| 4,942,561 | 7/1990 | Ohishi et al. | 368/118 |
| 5,001,508 | 3/1991 | Ogawa . | |
| 5,002,388 | 3/1991 | Ohishi et al. | 356/5 |
| 5,157,459 | 10/1992 | Oono et al. . | |
| 5,274,429 | 12/1993 | Misawa et al. . | |
| 5,317,375 | 5/1994 | Omamyuda et al. | 356/5 |

*Primary Examiner*—Mark Hellner
*Attorney, Agent, or Firm*—Greenblum & Bernstein, P.L.C.

[57] ABSTRACT

An electronic distance measuring device which includes a radiation source for emitting frequency-modulated radiation along one of two paths. The electronic distance measuring device also has a device for switching the emitted radiation from one of the two paths to the other of the two paths, a detector for detecting the radiation emitted along the paths, and a device for determining a difference in phase between the emitted radiation and the detected radiation. The detection of the phase difference is performed twice between two consecutive switchings of the light paths. A distance of the electronic distance measuring device from an objective station is then calculated in accordance with the determined phase difference.

12 Claims, 6 Drawing Sheets

SWITCH ON
SIGNAL OFF

EXTERNAL LIGHT PATH
INTERNAL LIGHT PATH

ELECTRONIC DISTANCE MEASURING DEVICE USING A PHASE DIFFERENCE DETECTION METHOD

BACKGROUND OF THE INVENTION

The present invention relates to an electronic distance measuring device in which the phase difference of an oscillating wave, such as a light wave, that has traveled along two different paths is used to measure a distance from the device to an objective station.

In a conventional electronic distance measuring device, the phase difference measuring method is employed. In the phase difference measuring method, light having an amplitude, modulated at a predetermined frequency, is emitted towards an objective station. The objective station has a reflector such as a prism, that reflects the emitted light back to a light receiving element of the electronic distance measuring device (i.e., the light travels along an external path). The distance is then calculated based on the phase difference between the emitted light and the received light that was propagated along the external path.

If the phase of the emitted light remains constant, then the distance measured will be accurate. However, the phase and frequency of the emitted light may vary as a result of changes in temperature, and tolerances of components used in the electronic distance measuring device. Therefore, the accuracy of the electronic distance measuring device will be reduced, resulting in a erroneous distance measurement.

In order to cancel these errors, the phase difference between the emitted light and light received by the light receiving element along an internal light path is also determined. Then, the distance of the electronic distance measuring device from the objective station is determined based on the phase difference of the light along the external path and the phase difference of the light along the internal path.

In general, the same light source is used for emitting light along the internal light path and the external light path. Further, since the length of the internal light path is known, the initial phase of the emitted light can be ignored.

In order to perform the measurement, a light path switching mechanism is provided for alternately routing the light emitted by the light source to the internal light path and the external light path. In the conventional electronic distance measuring device, light path switching mechanism reroutes the emitted light by using a mirror mounted on a bracket which is rotated between two angular positions by a motor. When the bracket is at a first position, the emitted light is routed to the external light path. When the bracket is at a second position, the emitted light is routed to the internal light path.

In order to obtain a distance measurement, the motor is controlled to move the bracket to the first position, and the phase difference along the external light path is measured. Then the motor is controlled to move the bracket to the second position, and the phase difference along the internal light path is measured. Then the distance of the electronic distance measuring device from the objective station can be determined. The above process is repeated 200 to 250 times within a few seconds, and the calculated distances are averaged in order to obtain the final distance measurement.

FIGS. 1A and 1B show timing diagrams of the distance measurement process. As shown in FIG. 1B, the motor must move the bracket to both the first and second position for each distance measurement. Therefore, the motor changes the position of the bracket 400 to 500 times when performing a distance measurement. This increases the time required to perform a distance measuring operation.

SUMMARY OF THE INVENTION

It is therefore an object of the invention to provide an improved electronic distance measurement device which is capable of determining the distance from the device to an objective station within relatively short period of time.

For the above object, according to the present invention, there is provided an improved electronic distance measuring device which includes a radiation source which emits frequency-modulated radiation along one of two paths. The electronic distance measuring device also has a device for switching the emitted radiation from one of the paths to the other of the paths, a detector for detecting the radiation emitted along the paths, and a device for determining a difference in phase between the emitted radiation and the detected radiation. The detection of the phase is performed twice between two consecutive switchings of the paths. A distance of the electronic distance measuring device from an objective station is then calculated in accordance with the determined phase difference.

Thus, in the preferred embodiment, the number of times that the switching of the path is performed is reduced by one half. This improves the speed at which the distance measurement can be performed.

Preferably, the radiation source emits light, and the light travels along either an internal light path or external light path. Moreover, other forms of radiation such as ultrasonic radiation may also be employed.

In the preferred embodiment, the calculating device calculates the distance based on two detected phase differences. One of the phase differences is detected before a switching of the light path, and the other of the phase differences is detected after the switching of the light path. Therefore, in the preferred embodiment, the phase difference of the internal light path is detected, the light path is switched to the external light path, and then the phase difference is detected. Then the distance is calculated. For the subsequent measurement, since the external light path is currently selected, the phase difference of the external light path is detected first, then the light path is switched to the internal light path, where the phase difference of the internal light path is detected and the distance is calculated. Therefore, the order of detecting the phase difference of the light paths for one distance calculation is reversed when detecting the phase difference of the light paths for the subsequent distance measurements.

Further, in the preferred embodiment, a plurality of detections of the phase difference and a plurality of calculations of the distance are performed during one distance measuring operation.

According to a second aspect of the present invention, there is provided a method for detecting distance from an electronic distance measuring device to an objective station having a light reflecting device. The method includes the steps of emitting light modulated in accordance with a predetermined frequency; and directing the light emitted by the light source to proceed along one of a first light path having a predetermined length and a second light path, where the second light path includes the objective station.

The method further includes repeatedly performing a distance measuring step consisting of the following four steps of detecting a phase difference between the emitted light and the received light, switching the light emitted by the light source to proceed along the other one of the first light path and the second light path, detecting another phase difference between the emitted light and the received light, and calculating a distance between the electronic distance measuring device and the objective station based on the phase difference and the other phase difference.

The last step of the method is averaging the calculated distances.

According to a third aspect of the present invention, there is provided an electronic distance measuring device for measuring a distance of the electronic distance measuring device from an objective station having a light reflecting device. The electronic distance measuring device includes a light source for emitting light modulated by a predetermined frequency, and a light receiving device for receiving light and obtaining a frequency signal carried by the received light. A first light path having a predetermined length is defined between the light source and the light receiving device. The electronic distance measuring device directs the light emitted by he light source to alternately proceed along the first light path and a second light path. The second light path is also defined between the light source and the light receiving device and includes the light reflecting device. A difference in phase between the emitted light and the received light is detected. A distance from the electronic distance measuring device to the objective station is then calculated based on a pair of phase differences of light subsequently passing through the first light path and the second light path with the phase difference being detected twice before a current light path is changed to the other the light path.

According to a fourth embodiment of the present invention, there is provided an electronic distance measuring device which includes a light source for emitting frequency-modulated light along one of two light paths, a device for switching the emitted light from one of the light paths to the other of the light paths, and a detector for detecting the light emitted along the light paths. The electronic distance measuring device determines a difference in phase between the emitted light and the detected light, and calculates a distance of the electronic distance measuring device from an objective station in accordance with the detected phase difference. The electronic distance measuring device also has a controller for controlling the switching device to switch the light paths such that an order of determining the phase difference between the emitted light and the detected light for the light paths is different for two consecutive distance calculations.

Thus, since the order of determining the phase difference of the light paths is not important, the number of steps required to determine the distance is reduced, and therefore, the time required to determine the distance is also reduced.

DESCRIPTION OF THE PREFERRED EMBODIMENT

An electronic distance measuring device 100 which embodies the present invention will be described below with reference to FIGS. 2 and 3.

Figure 1A:
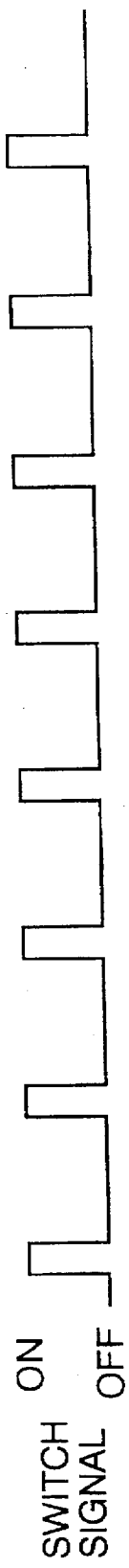
FIGS. 1A and 1B show timing diagrams for a light path switching mechanism used in a conventional electronic distance measuring device.
Figure 1B:
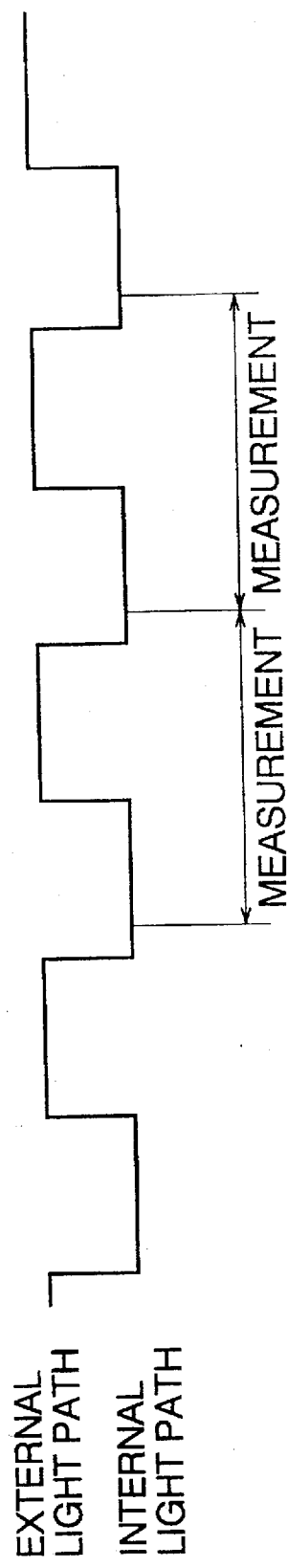
Figure 2:
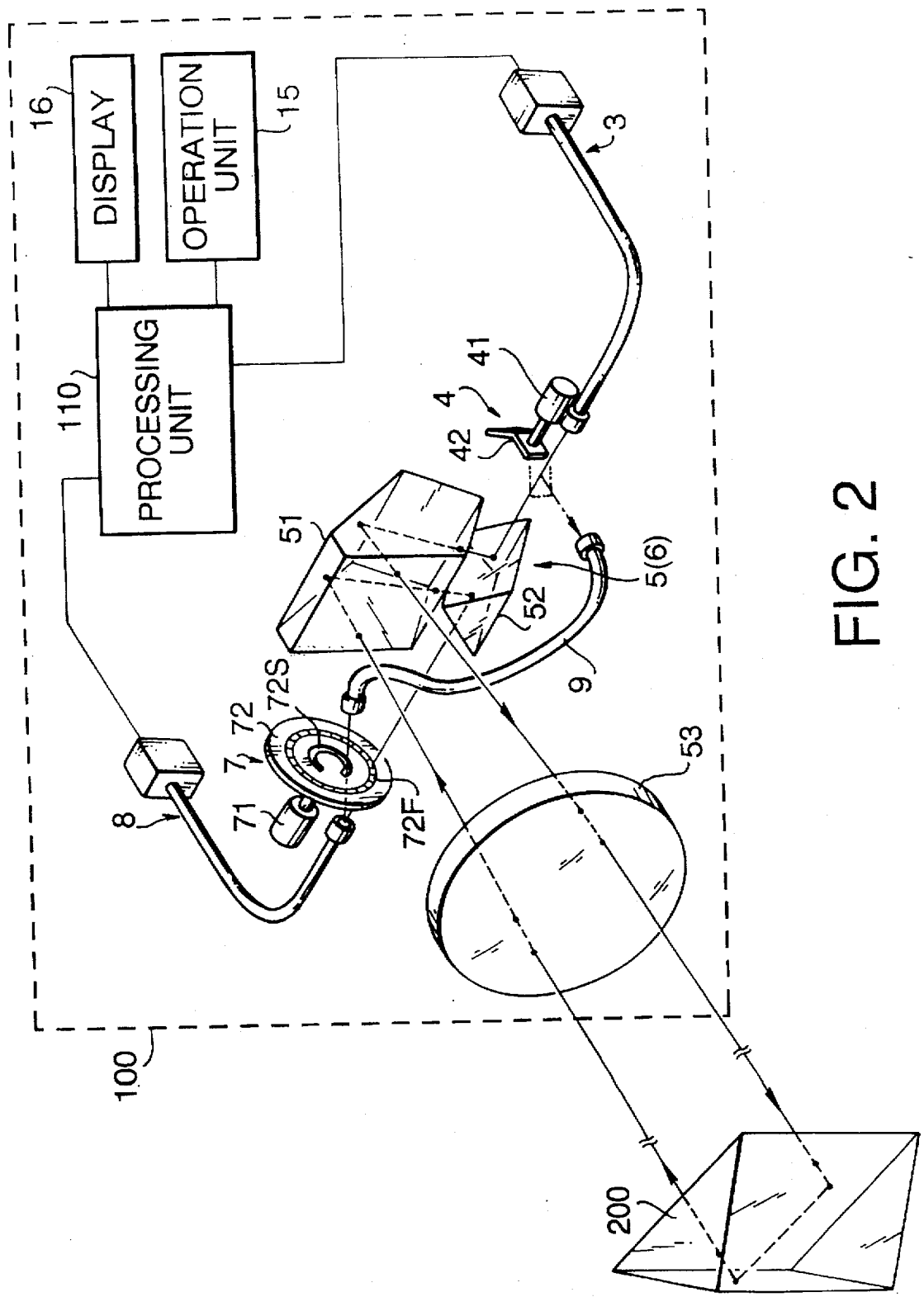
FIG. 2 shows a schematic of an electronic distance measuring device which embodies the present invention.

As shown in FIG. 2, the electronic distance measuring device 100 has a processing unit 110 which controls a light emitting unit 3 and a light receiving unit 8. The processing unit 110 modulates light transmitted by the light emitting unit 3. A light path switching unit 4 switches the light path from an internal light path 9 to an external light path. The external light path includes a light transmitting optical system 5, and a lens 53, which projects the modulated light to a prism 200 of an objective station.

The prism 200 reflects the light back to the electronic distance measuring device 100. The reflected light is transmitted through the lens 53, and incident on a light receiving optical system 6. A filter 7 then adjusts the amount of light that is transmitted from both the light receiving optical system 6 and the internal light path 9, to the light receiving unit 8. The light receiving unit 8 outputs an electrical signal to the processing unit 110. The processing unit 110 then determines the distance of the objective station from the electronic distance measuring device 100, in accordance with a difference in phase of the light received via the external light path and the light received via the internal light path.

An operation unit 15 has a plurality of keys for inputting commands and data. The commands that are input include commands for starting the distance measurement and for performing other operations. The data that is input includes the temperature and air pressure, which are used in order to compensate the distance measurement.

A display unit 16 has a liquid crystal display for displaying information which includes the measured distance.

Figure 3:
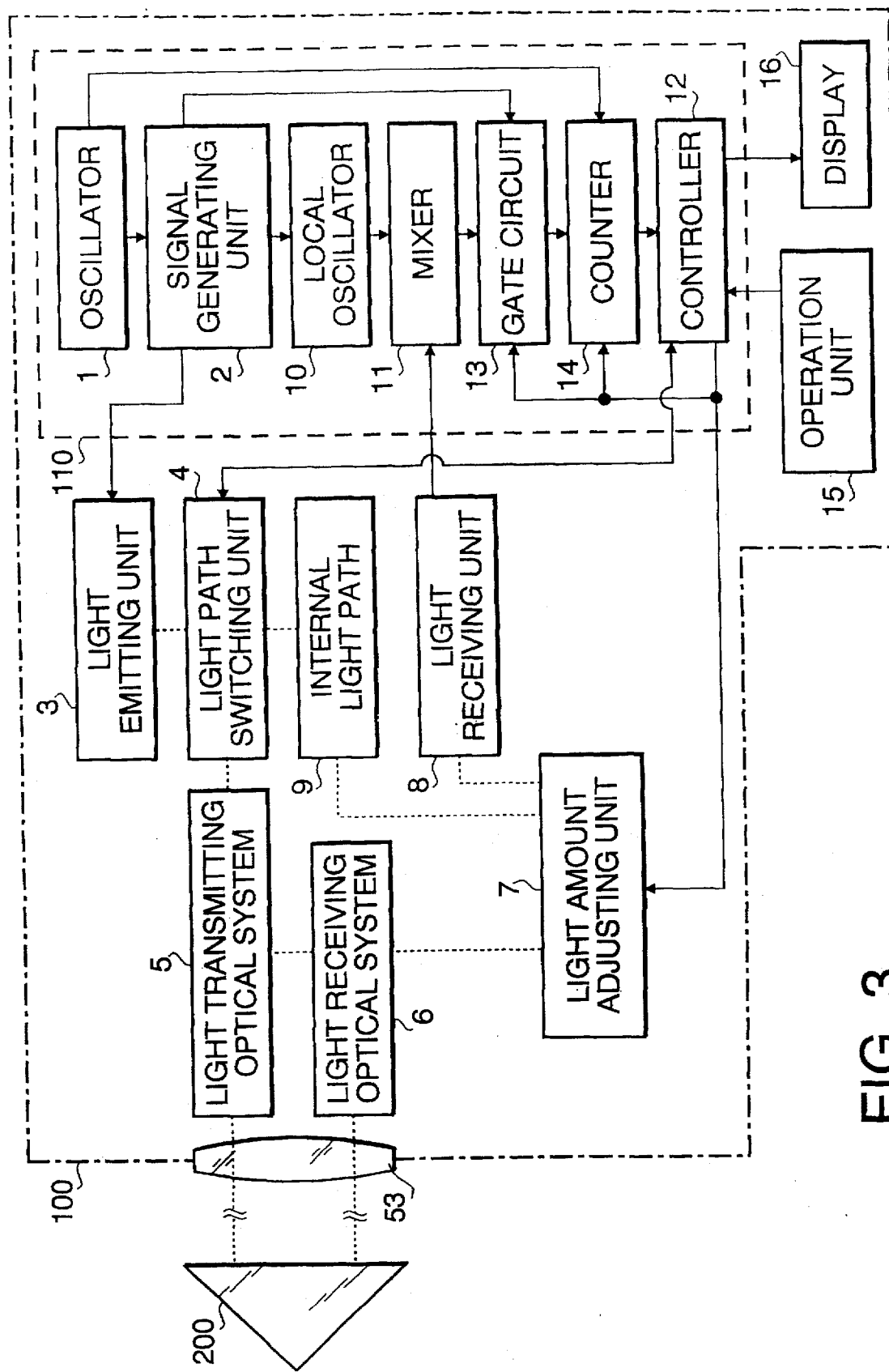
FIG. 3 is a block diagram of the electronic distance measuring device shown in FIG. 2.

As shown in FIG. 3 the processing unit 110 includes an oscillator, a signal generator 2, a local oscillator 10, a mixer 11, a controller 12, a gate circuit. 13, and a counter 14.

The oscillator 1 generates and outputs a reference signal having a predetermined frequency. The signal generator 2 receives the reference signal and generates a modulating signal used to modulate light emitted by the electronic distance measuring device 100.

The light emitting unit 3 provides a light source (not shown) for the electronic distance measuring device 100. In the preferred embodiment, the light source is a semiconductor laser. The modulating signal output by the signal generator 2 modulates the amplitude of the light emitted by the light emitting unit 3 at a frequency which is a multiple of the predetermined frequency.

The light path switching unit 4 receives the light emitted by the light emitting unit 3 and routes the emitted light to a light transmitting optical system 5 or an internal light path 9. The light path switching unit 4 has a mirror 42 that is driven by a motor 41. The motor 41 rotates the mirror 42 between a first position and a second position. When the mirror 42 is at the first position, the emitted light is routed to the light transmitting optical system 5, and when the mirror 42 is at the second position, the emitted light is routed to the internal light path 9.

The light transmitting unit 5 transmits the light through the lens 53 to be projected outside the electronic distance measuring device 100 (i.e., along an external light path). The light is reflected by a prism 200 at an objective station back to a light receiving Optical system 6 of the electronic distance measuring device 100, in the preferred embodiment, the light transmitting unit 5 includes a prism 51, and a prism 52.

The light receiving optical system 6 which includes the prism 51, and the prism 52, receives the light by the prism 200 and directs the light to the light receiving unit 8, through the filter 7. The filter 7 has a motor 71 and an attenuating disk 72. The attenuating disk 72 has a narrow slit 72S for uniformly attenuating light that is transmitted from the internal light path 9 to the light receiving optical unit 8. The attenuating disk 72 also has a variable attenuating filter 72F for varying the attenuation of the light that is transmitted from the light receiving optical system 6 to the light receiving unit 8. By rotating the attenuating disk 72, the variable attenuating filter 72F can adjust the amount of light transmitted from the light receiving optical system 6 to the light receiving unit 8 to be similar to the amount of light transmitted from the internal light path 9 to the light receiving unit 8. This improves the accuracy of the distance measurement, since the intensity of the light which is transmitted along the external path, and varies in accordance with the distance of the prism 200 of the objective station from the electronic distance measuring device 100, can be made uniform at the light receiving unit 8.

The light receiving unit 8 has a photodiode (not shown) and converts the received light into an electrical signal.

The internal light path 9 has an optical system for directing the emitted light from the light emitting unit 3 to the filter 7, and light receiving unit 8. In the preferred embodiment, the distance from the light emitting unit 3 to the light receiving unit 8, is known.

The local oscillator 10 receives a signal from the signal generator 2, and outputs a local oscillator signal having a known frequency to the mixer 11. The mixer 11 20. multiplies the signal output by the light receiving unit 8 with the local oscillator signal, and outputs a beat signal having a frequency which is equal to the difference between the frequency of the local oscillator signal and the frequency of the signal output by the light receiving unit 8. In the preferred embodiment, the beat signal has a frequency between 4 kHz and 6 kHz. The measurement of the phase difference is performed using the beat signal.

The gate circuit 13 generates a counter signal for the counter circuit 14 based on the phase difference of a gate signal output by the frequency generator 2 and the beat signal output by the mixer 11. The gate signal transmitted from the signal generator 2 to the gate circuit 13 is synchronized in phase with the signal used to modulate the light emitted by the light emitting unit 3. However, the frequency of the gate signal is the same as the frequency of the beat signal.

The counter circuit 14 counts the number of pulses of the signal output by the reference signal oscillator 1 in accordance with the counter signal output by the gate circuit 13.

The control unit 12 controls the gate circuit 13, the counter circuit 14, and the filter 7. Further, the control unit 12 calculates the distance based on the number of pulses counted by the counter circuit 14.

Figure 4A:
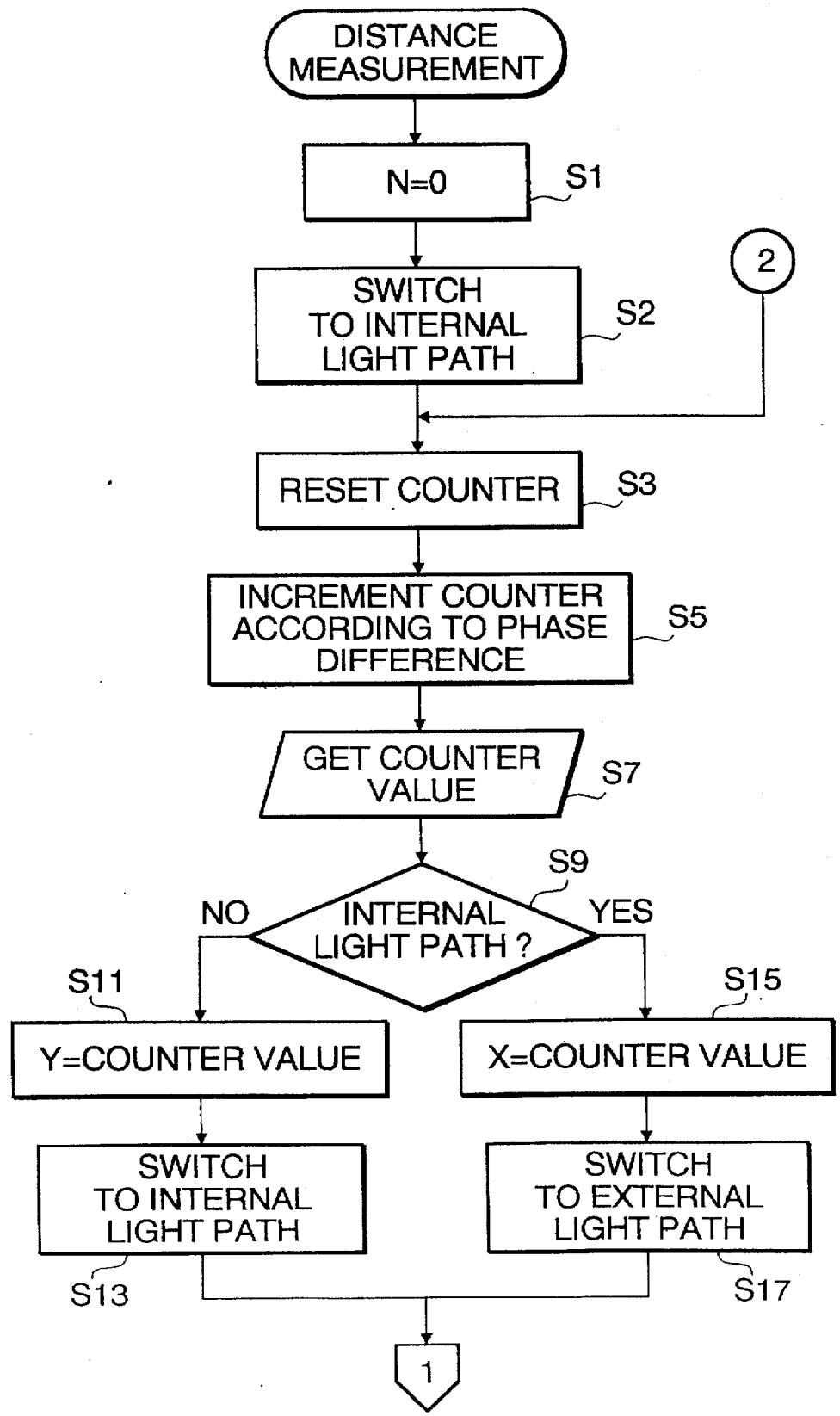
FIGS. 4A and 4B are flowcharts illustrating a distance measuring operation using the electronic distance measuring device shown in FIG. 2.
Figure 4B:
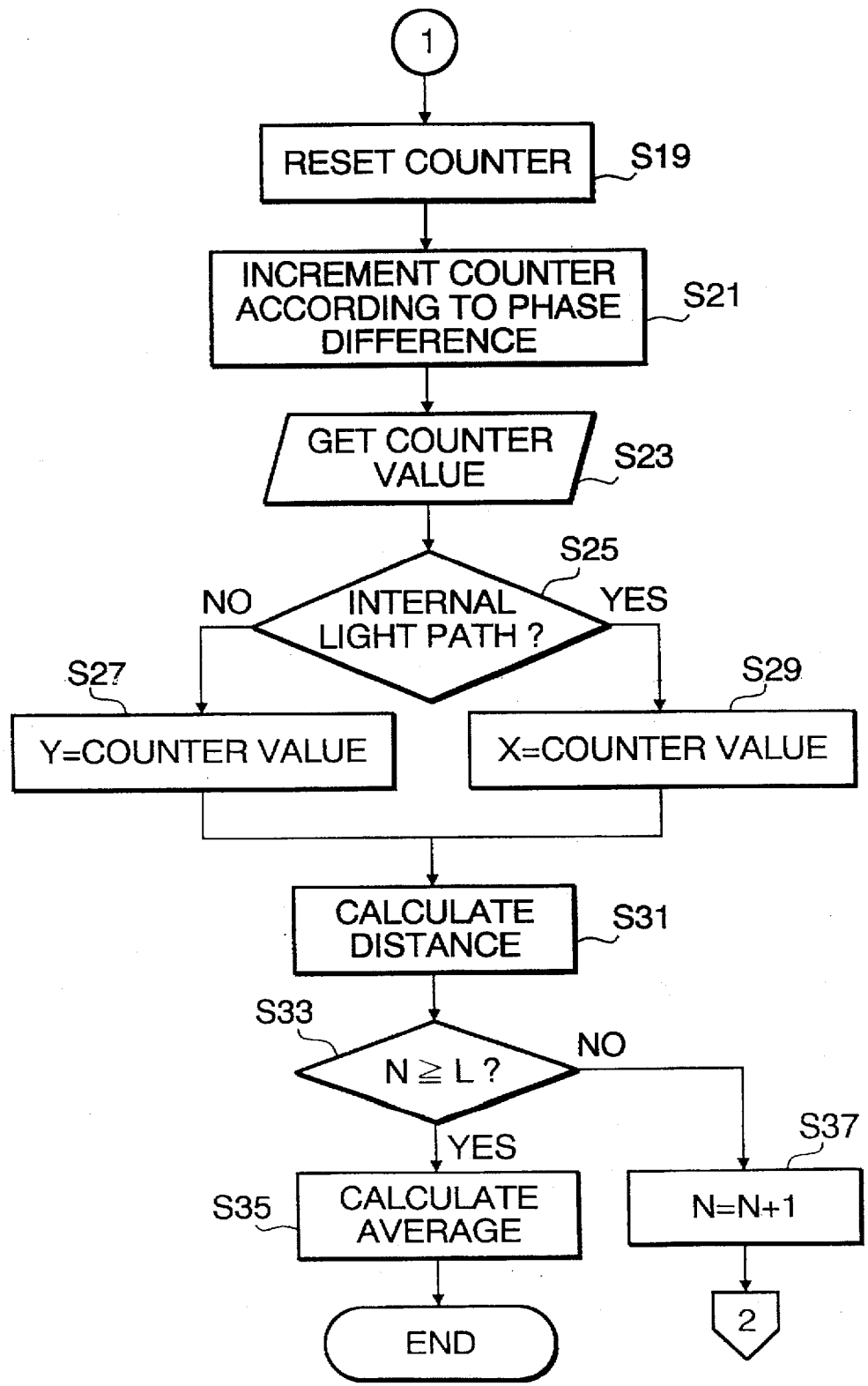

FIGS. 4A and 4B are flowcharts illustrating the distance measurement performed by the electronic distance measuring device 100.

In the phase difference method, one period of the modulated frequency is divided by a predetermined number into units. By counting the number of units corresponding to the phase difference between the emitted light and the received light, the phase difference is obtained. Therefore, the number of pulses counted by the counter circuit 14 corresponds to the phase difference between the emitted light and the received light.

When the distance measurement starts, a measurement counter N is set to zero in step S1. Then in step. S2, the controller 12 controls the light path switching mechanism to route the emitted light to the internal path. In step S3, a counter for counting the number of units corresponding to the phase difference is reset.

Measurement of the phase difference is performed in step S5. The measurement is executed by counting the number of units corresponding to the phase difference between the light emitted by the light transmitting unit and the light received by the light receiving unit When the measurement (counting) is finished, the number of pulses counted by the counter unit 14 is obtained in step S7. Step S9 determines whether the light path switching mechanism 3 is set to route the light along the internal light path.

If the light path switching mechanism 3 is set to route-the light along the internal light path (S9:Y), then the counter value is stored as a variable X in step S15. Then in step S17, the controller 12 controls the light path switching mechanism 3 to route the light-along the external light path.

However, if the light path switching mechanism 3 is set to route the light along the external light path (S9:N), then the counter value is stored as a variable Y in step S11. Then in step S13, the controller 12 controls the light path switching mechanism 3 to route the light along the internal light path.

The phase difference between the light emitted along the external light path and the light emitted along the internal light path (i.e., a reference light) include errors which are caused by the errors in the optical system and/or the temperature changes of the light source.

The above process is then repeated for the other light path in steps S19 through S29.

Thus in step S19, the value of the counter 14 is reset. Then in step S21, the measurement of the phase difference is performed in a manner similar to step S5 described above. When the measurement (counting) is finished, the number of pulses counted by the counter unit 14, is obtained in step S23. Step S25 determines whether the light path switching mechanism 3 is set to route the light along the internal light path.

If the light path switching mechanism 3 is set to route the light along the internal light path (S25:Y), then the counter value is stored as a variable X in step S29. However, if the light path switching mechanism 3 is set to route the light along the external light path (S25:N), then the counter value is stored as a variable Y in step S27.

Step S31 uses the variables X and Y to calculate the. distance of the electronic distance measuring device 100 to the objective station.

Step S37 determines whether the measurement has been performed a predetermined number of times L. In the preferred embodiment, the number L is between 20 and 250. If the measurement has not been performed L times (S33:N), count value N is incremented by one in step S37, and control returns to step S3 and the process is repeated for the next measurement value.

After the measurement process has been performed L times (S33:Y), step S39 calculates the average of the distances obtained. The averaged value is used as the valid distance which is obtained during one distance measurement operation.

As described above, in steps S3 through S17, the phase difference of the reference light is measured and stored as the variable X. Then the light path is switched, and the phase difference of the light along the external path is measured and stored as the variable Y, and the distance is calculated.

When control proceeds from step S37 to step S3 to repeat the above process, the light path is not switched. Therefore, for the next distance measurement the order of measuring the light along the internal light path and the light along the external light path is reversed. As a result, the number of times the light path switching mechanism is operated is equal to the number of distance measurements that are required.

Figure 5A:
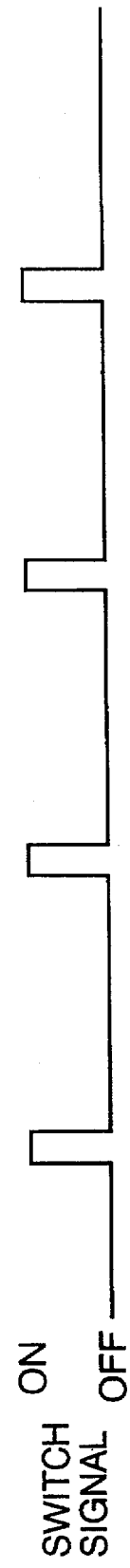
FIG. 5A and 5B are timing diagrams for a light path switching mechanism used in the electronic distance measuring device shown in FIG. 2.
Figure 5B:
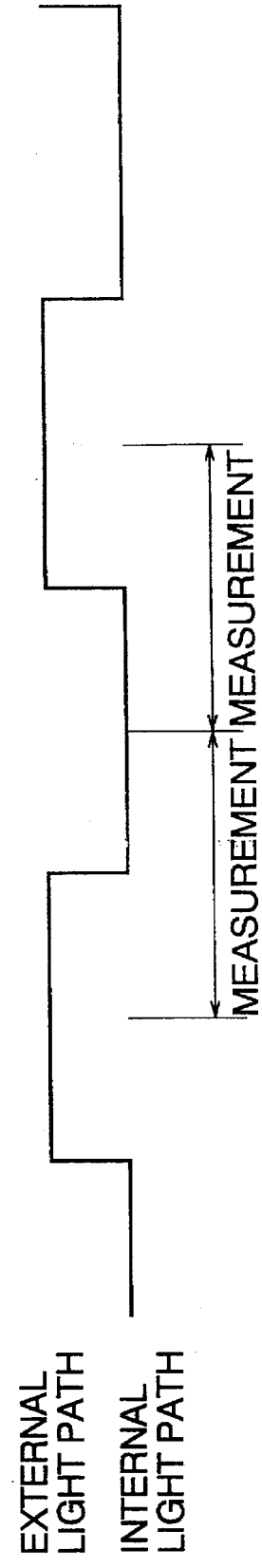

FIGS. 5A and 5B shows the relationship between the switching of the light path and light along the light path that is received. As shown in FIG. 5B, the phase difference of the light along the same light path is measured twice, in succession. The first phase difference measurement is for one distance measurement and the second phase difference measurement is for the subsequent distance measurement Then the light path is switched, and the phase measurement is done twice for the other light path.

As described above, according to the present invention, the number of times that the light path is switched in order to perform one distance measurement, is reduced by one half. Therefore, the time required to perform the distance measurement is substantially reduced. Further, the order of switching the light paths in order to measure the phase difference between the light paths is not fixed. This also reduces the time required to perform the distance measurement.

In the preferred embodiment, a light source is used. However, another radiation source such as an ultrasonic oscillator could also be used to determine the distance of the objective station from the electronic distance measuring device. In this case, in order to transmit and receive ultrasonic waves, the optical devices and light transmitting paths would need to be replaced with ultrasonic sensitive devices and sound propagating paths.

The present disclosure relates to a subject matter contained in Japanese Patent Applications No. HEI 7-43404, filed on Feb. 8, 1995, which is expressly incorporated herein by reference in its entirety.

What is claimed is:

1. An electronic distance measuring device, comprising:
   a radiation source which emits frequency-modulated radiation along one of two paths;
   a device for switching the emitted radiation from one of said two paths to the other of said two paths;
   a detector for detecting the radiation emitted along said two paths;
   a device for determining a difference in phase between said emitted radiation and said detected radiation, wherein said determination of said phase difference is performed twice between the period of two consecutive switchings of said paths; and
   a device for calculating a distance of said electronic distance measuring device from an objective station in accordance with said detected phase difference.

2. The electronic distance measuring device according to claim 1, wherein said calculating device calculates said distance based on two detected phase differences, one of said phase differences being detected before a switching between said two paths, and the other of said phase differences being detected after said switching between said two paths.

3. The electronic distance measuring device according to claim 1, wherein a plurality of determinations of said phase difference and a plurality of calculations of said distance are performed during one distance measuring operation.

4. The electronic distance measuring device according to claim 1, wherein one of said two paths has a fixed length and is internal to said electronic distance measuring device, and
   wherein the other of said two paths includes said objective station.

5. The electronic distance measuring device according to claim 1, said radiation source emitting light radiation, wherein said two paths are paths for transmitting light.

6. A method for detecting a distance from an electronic distance measuring device to an objective station having a light reflecting device, the method comprising the steps of:
   emitting light modulated in accordance with a predetermined frequency;
   directing the light emitted by the light source to proceed along one of a first light path having a predetermined length and a second light path, the second light path including the objective station;
   repeatedly performing a distance measuring step, the distance measuring step consisting of the following steps:
      (a) detecting a first phase difference between the emitted light and the received light;
      (b) switching the light emitted by the light source to proceed along an other one of the first light path and the second light path;
      (c) detecting a second phase difference between the emitted light and the received light; and
      (d) calculating a distance of the electronic distance measuring device from the objective station based on the first phase difference and the second phase difference; and
   averaging the calculated distances.

7. The method according to claim 6, wherein, one of the first phase difference and the second phase difference used in the calculating step is detected before the switching step switches the light path, and the other of the first phase difference and the second phase difference used in the calculating step is detected after the switching step switches the light path.

8. An electronic distance measuring device for measuring a distance of said electronic distance measuring device from an objective station, said objective station provided with a light reflecting device, said electronic distance measuring device comprising:
   a light source for emitting light modulated by a predetermined frequency;
   a light receiving device for receiving light and obtaining a frequency signal carried by the received light;
   means for defining a first light path having a predetermined length, said first light path being defined between said light source and said light receiving device;
   means for directing said light emitted by said light source to alternately proceed along said first light path and a second light path, said second light path being defined between said light source and said light receiving device, and said second light path including said light reflecting device;
   means for detecting a difference in phase between said emitted light and said received light;
   means for calculating a distance between said electronic distance measuring device to said objective station based on a pair of phase differences of light subsequently passing through said first light path and said second light path; and means for controlling said detecting means to detect said phase difference twice before a current light path is changed to the other of said light paths by said directing means.

9. The electronic distance measuring device according to claim 8, further comprising means for averaging said calculated values.

10. The electronic distance measuring device according to claim 8, wherein said first light path is internal to said electronic distance measuring device.

11. An electronic distance measuring device, comprising a light source which emits frequency-modulated light along one of two light paths;

a device for switching the emitted light from one of said two light paths to an other of said two light paths;

a detector for detecting the light emitted along said two light paths;

a device for determining a difference in phase between said emitted light and said detected light; and a device for calculating a distance of said electronic distance measuring device from an objective station in accordance with said detected phase difference, a controller for controlling said switching device to switch between said two light paths such that an order of determining said phase difference between said emitted light and said detected light for said two light paths is different for two consecutive distance calculations.

12. The electronic distance measuring device according to claim 11, wherein one of said two paths has a fixed length and is internal to said electronic distance measuring device, wherein the other of said two paths is an external light path which includes said objective station, and wherein said controller controls said switching device such that said calculating device calculates a first distance measurement based on a determination of a phase difference of said internal light path followed by a determination of a phase difference of said external light path, and said calculating device calculates a second distance measurement based on a determination of a phase difference of said external light path followed by a determination of a phase difference of said internal light path.

* * * * *